US010768006B2

(12) United States Patent
van der Molen et al.

(10) Patent No.: US 10,768,006 B2
(45) Date of Patent: Sep. 8, 2020

(54) METHODS AND SYSTEMS FOR GENERATING ROUTE DATA

(71) Applicant: TomTom International B.V., Amsterdam (NL)

(72) Inventors: Henk van der Molen, Amsterdam (NL); Jeroen Trum, Amsterdam (NL); Jan Willem van den Brand, Eindhoven (NL)

(73) Assignee: TOMTOM GLOBAL CONTENT B.V., Amsterdam (NL)

( * ) Notice: Subject to any disclaimer, the term of this patent is extended or adjusted under 35 U.S.C. 154(b) by 0 days.

(21) Appl. No.: 15/318,367

(22) PCT Filed: Jun. 12, 2015

(86) PCT No.: PCT/EP2015/063143
§ 371 (c)(1),
(2) Date: Dec. 13, 2016

(87) PCT Pub. No.: WO2015/189375
PCT Pub. Date: Dec. 17, 2015

(65) Prior Publication Data
US 2017/0122762 A1 May 4, 2017

(30) Foreign Application Priority Data

Jun. 13, 2014 (GB) .................................. 1410612.4

(51) Int. Cl.
*G01C 21/36* (2006.01)
*G01C 21/32* (2006.01)
(Continued)

(52) U.S. Cl.
CPC ......... *G01C 21/3602* (2013.01); *G01C 21/32* (2013.01); *G01C 21/3676* (2013.01);
(Continued)

(58) Field of Classification Search
None
See application file for complete search history.

(56) References Cited

U.S. PATENT DOCUMENTS 5,680,313 A 10/1997 Whittaker
8,849,494 B1 * 9/2014 Herbach ............ B60W 60/0015
701/24
(Continued)

FOREIGN PATENT DOCUMENTS

CA 101608924 A 11/2006
CN 102110370 A * 6/2011
(Continued)

OTHER PUBLICATIONS

EP2833322 A1 from google patents in english.*
(Continued)

*Primary Examiner* — Jean Paul Cass

(57) ABSTRACT

A device is provided to extract scan lines data from images of a route, said scan line data comprising only a portion of the an image that extends along a scan line, and to store this data in memory together with respective positional data pertaining to the position of the device traveling along the route in a navigable network. This scan line and positional data can be obtained from a plurality of devices in a network and transmitted to computing apparatus, for example, for use in a production of a realistic view of a digital map.

25 Claims, 9 Drawing Sheets

(51) Int. Cl.
*G06K 9/00* (2006.01)
*G09B 29/10* (2006.01)
*G01S 19/48* (2010.01)
*G06F 16/29* (2019.01)
*G01S 19/01* (2010.01)

(52) U.S. Cl.
CPC .............. *G01S 19/01* (2013.01); *G01S 19/48* (2013.01); *G06F 16/29* (2019.01); *G06K 9/00771* (2013.01); *G06K 9/00798* (2013.01); *G09B 29/106* (2013.01)

(56) References Cited

U.S. PATENT DOCUMENTS

| | | | | |
|---|---|---|---|---|
| 8,970,625 | B2* | 3/2015 | Chavez | G06F 3/013 |
| | | | | 345/633 |
| 9,157,757 | B1* | 10/2015 | Liao | G01C 21/20 |
| 9,244,159 | B1* | 1/2016 | Korchev | G01S 7/414 |
| 9,437,038 | B1* | 9/2016 | Costello | G06T 15/08 |
| 9,563,852 | B1* | 2/2017 | Wiles | G06Q 10/04 |
| 9,591,295 | B2* | 3/2017 | Lockhart | G06F 3/048 |
| 9,595,127 | B2* | 3/2017 | Champion | G06F 3/012 |
| 9,606,241 | B2* | 3/2017 | Varoglu | G01S 19/48 |
| 9,623,905 | B2* | 4/2017 | Shashua | G08G 1/0112 |
| 9,631,936 | B2* | 4/2017 | Shashua | G06F 16/29 |
| 9,631,943 | B2* | 4/2017 | Shashua | G01C 21/3623 |
| 9,696,719 | B2* | 7/2017 | Aviel | G08G 1/0112 |
| 9,709,986 | B2* | 7/2017 | Gdalyahu | G06K 9/00798 |
| 9,760,090 | B2* | 9/2017 | Shashua | G01C 21/32 |
| 9,817,399 | B2* | 11/2017 | Braunstein | G01C 21/165 |
| 2002/0071038 | A1* | 6/2002 | Mihelcic | G06T 17/00 |
| | | | | 348/207.99 |
| 2005/0111009 | A1* | 5/2005 | Keightley | G01B 11/25 |
| | | | | 356/602 |
| 2005/0259158 | A1* | 11/2005 | Jacob | H04N 5/3456 |
| | | | | 348/218.1 |
| 2006/0271286 | A1 | 11/2006 | Rosenberg | |
| 2007/0150188 | A1 | 6/2007 | Rosenberg | |
| 2007/0271286 | A1 | 11/2007 | Rosenberg | |
| 2009/0115862 | A1 | 5/2009 | Andersson | |
| 2009/0157311 | A1* | 6/2009 | Seltzer | G01C 21/3492 |
| | | | | 701/414 |
| 2009/0203993 | A1* | 8/2009 | Mangat | A61K 49/0032 |
| | | | | 600/431 |
| 2009/0203996 | A1* | 8/2009 | Thiele | A61B 8/467 |
| | | | | 600/441 |
| 2009/0226152 | A1* | 9/2009 | Hanes | H04N 19/44 |
| | | | | 386/248 |
| 2010/0118116 | A1* | 5/2010 | Tomasz | G06T 15/10 |
| | | | | 348/36 |
| 2010/0292921 | A1* | 11/2010 | Zachariah | G06Q 10/00 |
| | | | | 701/533 |
| 2010/0302280 | A1 | 12/2010 | Szeliski et al. | |
| 2011/0046775 | A1* | 2/2011 | Bailey | B07C 3/02 |
| | | | | 700/224 |
| 2011/0208689 | A1* | 8/2011 | Chakraborty | G06N 5/022 |
| | | | | 706/59 |
| 2013/0096817 | A1* | 4/2013 | Fauci | H04W 4/029 |
| | | | | 701/411 |
| 2013/0143590 | A1* | 6/2013 | Sridhara | G01S 5/0252 |
| | | | | 455/456.1 |
| 2013/0266175 | A1* | 10/2013 | Zhang | G06T 7/181 |
| | | | | 382/103 |
| 2015/0348496 | A1* | 12/2015 | Santos, II | G06F 9/4451 |
| | | | | 345/520 |
| 2016/0287211 | A1* | 10/2016 | DaCosta | A61B 8/4444 |
| 2017/0008521 | A1* | 1/2017 | Braunstein | G08G 1/096805 |
| 2017/0075101 | A1* | 3/2017 | Hawes | G02B 21/365 |
| 2017/0122762 | A1* | 5/2017 | van der Molen | G01S 19/01 |
| 2017/0215028 | A1* | 7/2017 | Rhoads | H04W 4/025 |
| 2017/0228935 | A1* | 8/2017 | Foster | G06F 1/1694 |
| 2017/0236322 | A1* | 8/2017 | Catalano | G06T 15/06 |
| | | | | 345/426 |
| 2017/0248960 | A1* | 8/2017 | Shashua | G06F 16/2379 |
| 2017/0287216 | A1* | 10/2017 | Kim | G06T 17/00 |
| 2017/0336792 | A1* | 11/2017 | Gdalyahu | G08G 1/0112 |
| 2017/0336793 | A1* | 11/2017 | Shashua | G05D 1/0246 |
| 2017/0336794 | A1* | 11/2017 | Shashua | G01C 21/36 |
| 2017/0336801 | A1* | 11/2017 | Shashua | G06K 9/00818 |
| 2017/0364082 | A1* | 12/2017 | Taieb | G05D 1/0212 |
| 2017/0371142 | A1* | 12/2017 | Anthony | H04N 1/00 |
| 2018/0232052 | A1* | 8/2018 | Chizeck | B23K 9/0953 |
| 2019/0076024 | A1* | 3/2019 | Gosink | A61B 5/0205 |
| 2019/0094027 | A1* | 3/2019 | Xu | G05D 1/028 |

FOREIGN PATENT DOCUMENTS

| | | | |
|---|---|---|---|
| CN | 103366156 A | 10/2013 | |
| EP | 1944734 A2 * | 7/2008 | ......... G06K 9/00798 |
| EP | 2215429 A1 | 8/2010 | |
| EP | 2833322 * | 6/2013 | |
| JP | H05197790 A | 8/1993 | |
| JP | H06341821 A | 12/1994 | |
| JP | H778255 A | 3/1995 | |
| JP | H0778255 A | 3/1995 | |
| JP | H0969162 A | 3/1997 | |
| JP | H11108671 A | 4/1999 | |
| JP | 2008039687 A | 2/2008 | |
| JP | 2010152139 A | 7/2010 | |
| JP | 2010152835 A | 7/2010 | |
| JP | 201150689 A * | 8/2011 | |
| JP | 2014106901 A | 6/2014 | |

OTHER PUBLICATIONS

EP1944734 B1 to Seta from google patents.*
CN102110370 A google translation.*
"Traffic Data Collection for FCD Enhancement in V2I Networks" by Llorca et al. Hindawi Publishing Corporation EURASIP Journal on Advances in Signal Processing vol. 2010, Article ID 719294, 13 pages. doi:10.1155/20101719294. Accepted Jul. 5, 2010.
Search Report dated Dec. 18, 2014 for United Kingdom patent application No. 1410612.4.
International Search Report dated Aug. 21, 2015 for International patent application No. PCT/EP2015/063143.

* cited by examiner

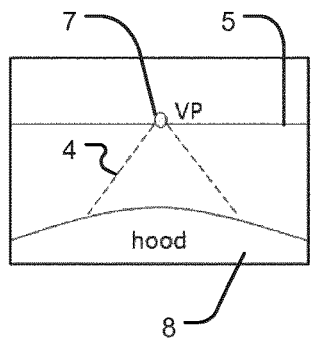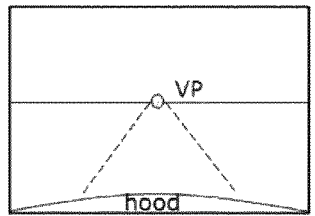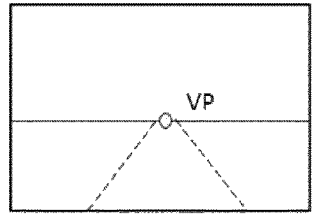
Figure 5A    Figure 5B    Figure 5C
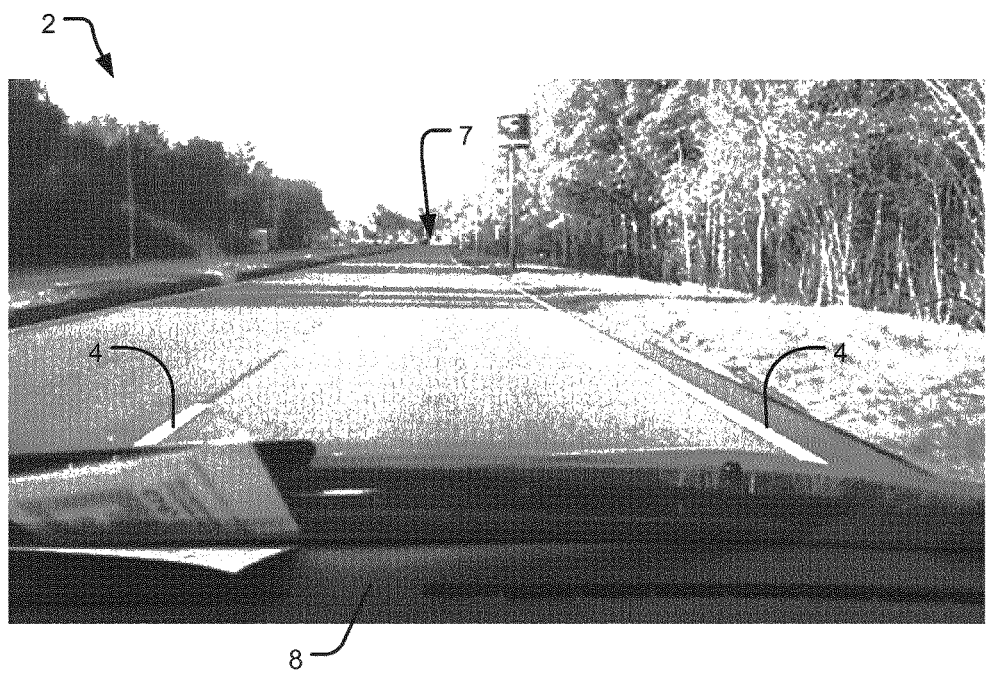
Figure 5D

METHODS AND SYSTEMS FOR GENERATING ROUTE DATA

CROSS-REFERENCES TO RELATED APPLICATIONS

This application is the National Stage of International Application No. PCT/EP2015/063143, filed Jun. 12, 2015, and designating the United States, which claims benefit to United Kingdom Patent Application No. 1410612.4 filed Jun. 13, 2014. The entire content of these applications is incorporated herein by reference.

FIELD OF THE INVENTION

The present invention relates to methods and systems for continuously generating route data. An example application of the invention is in the production of a realistic view of a digital map of a route. Other exemplary applications include the determination of road markings, e.g. lane dividers, exit arrows, etc, and the determination of the position of a vehicle in a lane.

BACKGROUND TO THE INVENTION

There is a continuing demand for accurate route data for use in the production of digital maps. Portable navigation devices (PND), such as dedicated portable satellite navigation devices, in-built vehicle navigation systems and smartphones incorporating global positioning system (GPS) receivers and mapping software have become commonplace. These devices provide navigational instructions using digital maps that may be stored remotely and accessed via a wireless network, or stored locally on the device. These maps typically have relatively reliable information concerning the existence and locations of various routes in a navigable network; such as roads, highways or paths. Route information is currently typically stored in digital map databases as a sequence of nodes pinpointing the centreline of a route (typically detected using GPS probe data), views of which are generated by joining the nodes using, for example, a spline function, which is then usable to render a simple view of the route as a line along which the PND progresses in transit. However these map resources and views often lack more detailed information such as the number of lanes on the road or road sign content. Further, there is a desire to include additional information to these digital maps, so as to build up-to-date realistic views of routes. As the prevalence of these devices ever increases and road layouts continue to change, there is a persistent need for more data to update the maps to the best available accuracy.

A potential source for route data used to generate detailed views of digital maps is satellite imagery of the Earth. This technique is relatively accurate in identifying the location of roads or 'routes' for building a digital map and in providing views of these routes. Satellite imagery, however, has various disadvantages to it. By their very nature, satellites can only offer a view of a route from above. Areas of the route that are obscured by the presence of intervening matter, such as tunnels, trees, bridges, clouds, etc, or features which are not be visible from above, such as road signs, or which require a higher resolution than is available will not be imaged. These images are also generally costly and time consuming to acquire in practice, so are rarely up to date.

Third parties, such as governments or local authorities, are a potential further source of route data. These parties may notify the map makers of the existence of new routes, or to the presence of road works or various other features on a map. Such data is typically unreliable however, often unavailable and does not generally offer views of routes.

Route data can also be collected from mobile mapping vehicles. These vehicles have been used in abundance by Google™ in the creation of their Street View™ images. Multiple images of a route are acquired across a 360 degree view using a moving van with several cameras mounted to it. Positional data is acquired from GPS data and fused to these images so as to build a realistic view of the route in the digital map. Although mobile mapping vehicles are able to offer roadside views of a route at higher level of detail than is available from satellite images, they share two other disadvantages with satellite images; namely their high cost and the time consuming method by which the images are obtained. This, in practice, means that the route data acquired also quickly falls out of date and is rarely updated.

There therefore is a need for an alternative means for obtaining route data for use in the production of detailed and up-to-date views of a digital map that overcomes the above-mentioned limitations in the art.

SUMMARY OF THE INVENTION

According to a first aspect of the invention there is provided a method of continuously generating route data, comprising:

receiving a position data feed pertaining to a position of an image capturing device travelling along a route in a navigable network;

receiving images of the route captured using the image capturing device as it progresses along the route so as to obtain a view of the route;

extracting scan line data from said images, said scan line data comprising only a portion of an image that extends along a scan line; and storing said scan line data in memory together with respective positional data for the scan line, wherein said positional data is based on the position data feed.

The present invention also extends to a device, optionally a portable navigation device, for carrying out the method.

Thus, in accordance with a second aspect of the invention, there is provided a device for continuously generating route data, comprising:

means for receiving a position data feed pertaining to a position of an image capturing device travelling along a route in a navigable network;

means for receiving images of the route captured using the image capturing device as it progresses along the route so as to obtain a view of the route;

means for extracting scan line data from said images, said scan line data comprising only a portion of an image that extends along a scan line; and means for storing said scan line data in memory together with respective positional data for the scan line, wherein said positional data is based on the position data feed.

The present invention in this further aspect may include any or all of the features described in relation to the first aspect of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors.

Therefore, in accordance with a third aspect of the invention, there is provided a device for continuously generating route data, comprising: one or more processors; and memory comprising instructions which, when executed by one or more of the processors, causes the device to:

receive a position data feed pertaining to a position of an image capturing device travelling along a route in a navigable network;

receive images of the route captured using the image capturing device as it progresses along the route so as to obtain a view of the route;

extract scan line data from said images, said scan line data comprising only a portion of an image that extends along a scan line; and store said scan line data in memory together with respective positional data for the scan line, wherein said positional data is based on the position data feed.

A new apparatus for obtaining route data is therefore provided which overcomes the limitations in the prior art discussed above. A device, which can be in the form of a portable navigation device (PND), is provided that can be used to passively collect visual route data which can then be communicated in an efficient manner through a network, as enabled by the use of the scan line. A plurality of devices may be provided within this network, with each device providing a potential feed of route data. This enables the passive mass collection of visual route data in an extremely efficient manner, effectively by crowd sourcing. The visual route data provided by the scan line date is usable, for example, in generating realistic views of routes in a digital map. The route data generated by a device may be processed and eventually shared with other devices within the network, such as by realistic view simulation/generation at a central server, so as to enhance the quality and quantity of the data available throughout the network. This is particularly useful in the rendering of realistic and up-to-date views of routes.

The route data contains positional data taken from a position data feed that may be obtained, for example, by a navigation satellite, e.g. GPS, receiver internal or external to the device. The route data further comprises scan line data that is essentially an extract of an image of a route that extends along a scan line as the device progresses along the route. The image is preferably obtained by an image capturing device, e.g. a camera, that is aligned, or at least substantially aligned, in the direction of travel so as to image the road or 'route' ahead, or potentially behind and along the direction of the route. This would be the case, for example, when a camera (or other similar device) is provided on the rear surface of the PND (opposite to the display) and the PND is affixed to a vehicle windscreen, as is typically the case for smartphone usage. Alternatively, these images could be captured using a camera (or other similar device) that is external to, but in electrical communication with, the device, as is contemplated for in-built vehicle navigation systems. The scan line data and respective positional data for the scan line are then stored together in memory. A slight misalignment can be accounted for using software, so long as part of the route is in view.

Previously, it has not been considered possible to obtain visual route data from non-specialist mapping vehicles, because computing devices in normal vehicles typically lack the necessary processing power (e.g. fast processors, a large memory and access to high speed network connections) to obtain multiple images of a route whilst in motion and to continuously upload this data to a server via a wireless network, or to store this information locally to be uploaded at a later time. The present invention overcomes this limitation by making intelligent selections of the image data to be extracted from an image of a route such that the overall quantity of data stored and transmitted is significantly reduced. In this way, a detailed picture of a route can be built up as a vehicle (containing a device according to the present invention) progresses along the route in a highly compressed and extremely efficient manner.

Each image of the full field of view captured by the camera, e.g. in a PND, typically contains approximately 1 MB of data—transmitting this would require an extremely high upload bandwidth and a large data transfer for a video feed of progression along a route, which renders this impractical. Instead, scan line data is taken from said images so as to extract image data from only a portion (or fraction) of the image that extends along a scan line. Accordingly, the scan line data for an image preferably comprises, and typically consists of, a linear portion of the image of a predetermined width that extends along a scan line of a predetermined shape. This scan line data can, for example, be collected for a 1 kilometre stretch of road and be compressed into a greyscale 10 KB image using JPEG-compression without losing relevant route information. Thus a 100 kilometre route, which can typically be covered in 100-150 images, can be stored in only 1 MB of data. This data, together with associated positional data may be readily stored locally on a vehicle (carrying the device), e.g. on the PND itself, and uploaded to a server over a cellular telecommunications network whilst in motion for example, or at a later time when a low cost alternative, such as WiFi, becomes available. Furthermore, and when the image capturing device forms part of a navigation device, the acquisition, storage and transmission of this route data does not affect the performance of the navigation device and so can effectively occur without requiring the user's attention.

By providing a system by which route data can be obtained using devices associated with normal vehicles, i.e. non-specialist mapping vehicles, route data can be crowd sourced. The devices associated with vehicles can include any device that comprises, or receives a feed from, an image capturing device. For example, the image capturing device could be built into the vehicle, e.g. as a parking assistance device or the like, or could be an aftermarket component that is mounted to the vehicle. In other embodiments, the image capturing device could be integral with the computing device, e.g. in the form of a smartphone or PND. This means, for example, that PND users can generate route data which may be processed and later returned to them, or shared with other PND users so as to improve the quality of their digital maps. By crowd sourcing the route data as such, route data may be readily and efficiently obtained without the need for costly satellite images or mobile mapping vehicles. Maps of navigable networks, which are built using said route data, can be continuously updated from a network of communicating devices, e.g. PNDs. These maps can hence react quickly to changes in the route, for example to the presence of road works, changes in the lane layout, etc. The route data obtained can also be processed to obtain additional visual information about the route that may be identified from the scan line images, such as the number of lanes, road signs, the colour of the road, trees and other visual features. This additional data helps mapping providers to generate realistic, up-to-date views of routes which enhance the overall experience available to the user.

For the route data to be particularly useful in the production of a realistic view, the scan line is arranged to extend across a view of the route. A further benefit is realised wherein the device is caused to monitor a hood line corresponding to the outline of a vehicle hood in the view of the route, to monitor the position of a vanishing point in the view of the route and, to arrange the scan line at a predetermined position with respect to the hood line and the vanishing point. This process effectively calibrates the scan line position so that the scan line stretches across a portion of the image containing information of the route that may be useful in the production of a realistic view. Obtaining scan lines that are either purely in the area of the vehicle hood will likely render the results useless. Similarly, it is undesirable obtain scan lines that are above the horizon in the event that lane detection is intended, however this could be useful where weather or overhanging road sign detection is intended. The area of interest for line scanning preferably lies between a vehicle hood (also known as a bonnet) and the horizon so that a view of the road ahead is extracted. In this way the device automatically and dynamically calibrates the scan line positioning to capture the most useful data.

The step of receiving a position data feed pertaining to a position of the portable navigational device travelling along a route in a navigable network is preferably performed by a position data feed receiver. Furthermore, an image receiver may be provided to receive images captured using a camera aligned in the direction of travel as the device progresses along the route so as to obtain a view of the route in said images. Both or either of the position data feed receiver and the image receiver may in practice be hardware, software, or a mixture of both.

A hood line is preferably monitored by tracking one or more features shown in images of the route that move downwards between successive images of the route as the camera moves towards said features; monitoring the lowest positions of said moving features shown in the field of view of the camera; and, determining a hood line based on said monitored lowest positions.

Monitoring the hood line may alternatively, or in addition, include monitoring various other features that may obstruct a view of the route such as windscreen wipers or the dashboard. Where present, the outline of these features may be detected and may form part of the detected "hood line". An image mask may then be applied so that pixels within the image below the hood line, i.e. that do not include a view of the route, are ignored. In some cases it may be determined that there is no hood line in the image and thus a notional hood line may be set at the bottom of the image. The vanishing point may also be monitored and the scan line preferably arranged at a predetermined position with respect to the hood line and the vanishing point. This process may occur upon initialisation of the device and could be repeated, for example on a timer, or based on the position data feed, whilst the device (or the vehicle associated with the device) travels along a route to ensure that the scan line remains in the optimal or intended position. Repeating the process is desirable to compensate for possible movements of the camera that may result from a user operating the device, e.g. PND, or from vibrations due to impact of bumps in the road, or non-inertial forces.

Knowing the position of the vanishing point can help in determining the position of the scan line, and in interpreting said scan lines. Vanishing point detection for road scenes can be implemented by determining road lines that are close to vertical and then computing their intersection. More preferably, monitoring the position of the vanishing point comprises monitoring first and second bearings in the direction of travel at first and second positions respectively based on the position data feed, calculating if the device was travelling in a substantially straight line between the first and second positions in accordance with said monitored first and second bearings, monitoring two or more straight road lines in the view of the route in the direction of travel, calculating the intersection position for said road lines and, if the device was calculated to be travelling in a substantially straight line between the first and second positions, outputting said intersection position as the vanishing point in the view of the route. The first and second positions are preferably distally spaced by at least 50 metres in the direction of travel. Vanishing point detection techniques using road markings can thus be improved upon using positional information by only accepting vanishing points that are detected for a straight or substantially straight road.

It is also possible to determine the position of the vanishing point and the hood line by enabling a user to identify these features through a user interface provided on the PND. Standard object recognition techniques can be used in addition to this to simplify the procedure, or alternatively image (or object) processing techniques, e.g. as described above, can be used to determine the position of the vanishing point and the hood line by enabling a user.

The predetermined position of the scan line preferably extends across a broad view of the route at a high level of detail and is either dynamically determined or is at a fixed position. This enables an optimal view of the route to be extracted by each scan line. It is important to select a suitable height for the scan line in the image of the route. The lowest position above the vehicle hood results in the widest and most position-accurate lane markings, but the field of view is small. Recording at a line higher up in the image gives more overview (and potentially more lanes), but loses detail. The optimal solution preferably lies somewhere in between.

Determining an optimal position can be performed in a number of ways. Dynamically determining the position involves analysing images obtained by the camera along the route (including, potentially any of monitoring a horizon vanishing point or a hood line) and positioning the scan line in accordance with said analysis. This may be regularly performed as the device (or vehicle incorporating the device) progresses along a route, with adjustments being made where necessary. This is desirable so that the device may react when the view of the route has significantly changed, for example because the camera was moved, or because of a steep incline in the view of the road ahead. Alternatively, in order to reduce the processing power required or where the results of the image analysis are inconclusive, the scan line may be selected as a pre-determined shape at a pre-determined position across the image; for example a horizontal line half way up the image. Preferably, said predetermined position of the scan line is between the vanishing point and the hood line and does not substantially intersect the hood line. Furthermore, preferably said scan line subtends an angle of at least 60 degrees, more preferably at least 90 degrees, beneath the vanishing point.

In one example said scan line is a substantially horizontal straight line that extends substantially across the field of view. This configuration is advantageous where simple lane information is desired for example. This is not necessarily the only option however as additional route data and different perspectives may be obtained using a variety differently shaped open or closed lines. For example, the scan line may be a rectangle (including a square), an arc, an ellipse (including a circle) or a U-shaped box. In another example said scan line substantially tangentially intersects a radial line extending down from the vanishing point, and preferably also substantially tangentially intersects radial lines extending up, left and right from the vanishing point. The scan line is typically one pixel 'thick' or 'wide', however it could be larger than this, depending on the resolution of the camera.

In embodiments where the scan line is a U-shaped box, the bottom of the box preferably has the same width for each captured image, such that when the scan lines are stitched together, e.g. as discussed in more detail below, the scan lines each have substantially the same scale.

In embodiments where the scan line is an ellipse, the ellipse may be arranged so as to extend around the vanishing point and not substantially intersect the hood line.

The images of the route are typically captured at a constant frame rate from a video feed obtained from the camera. Said frame rate is preferably between 1 and 30 frames per second. A higher frame rate is desirable and preferably the frame rate may be variable, for example image capture is preferably triggered in accordance with predetermined image capture distances along the route based on the position data feed. These predetermined image capture distances are preferably equidistant and preferably still, are between 0.1 and 5 metres. The size of the predetermined distal intervals at which image capture is triggered may depend on the nature of the route data that is desired. Smaller distances provide increased detail however require additional memory. If larger distal intervals are selected, certain features, such as arrows that are painted onto the road, may be missed. This can be corrected for to some extent however by statistical analysis of route data obtained from multiple devices, e.g. PNDs.

A particular benefit is realised wherein the device is further arranged to: monitor the velocity of the device in accordance with the position data feed; and, if at said velocity the frame rate required to capture images of the route at said predetermined image capture distances exceeds a maximum frame rate of the camera, obtain scan line data from one or more additional scan lines from said images, wherein the position of each additional scan line is determined so as to cover a view of the route at a predetermined image capture distance. Additional scan lines may hence be obtained from an image or frame in order to achieve equidistant scan lines (i.e. scan line data depicting a view of a route at substantially equal distances along that route) when the maximum frame rate of the camera is too low to obtain a single scan line from individual images obtained at desired locations along the route. The number of lines to be scanned can be determined by the time travelled between successive frames captured by the camera.

The respective positional data for the scan line data which is stored in memory preferably accounts for the distal separation between the device or the image capturing device as appropriate, which is obtained from the position data feed, and the position of the route shown by the scan line. This accounts for the discrepancy between the position of the route depicted by a scan line and the position of the device itself, and thus increases the positional accuracy of the route data. Said distal separation may be accounted for by a variety of techniques, for example calculations based on monitored positions of the vanishing point with respect to the scan line.

The position data feed is preferably obtained from a navigation satellite receiver, e.g. a GPS receiver, that preferably includes an antenna by means of which satellite-broadcast signals, including location data, can be received and subsequently processed to determine a current location of the device (or image capturing device). The navigation satellite receiver may be internal or external to the device. Alternatively the position data feed may be obtained from information provided by a wireless network to which the device, e.g. PND, or a device in connection with said PND is connected.

Preferably an accelerometer is provided that is in electrical communication with processors and configured to monitor a tilt of the camera. In this case the processor may issue instructions further cause the device to adjust for the position of the scan line in accordance with said monitored tilt. Preferably still, the accelerometer is configured to detect vibrations of the camera. In this case instructions issued by the processor further cause the device to correct for artefacts in the images that result from said vibrations.

Smartphones typically contain cameras that are located on the opposite side to the display or screen. These can hence be conveniently positioned on a vehicle windscreen so as to capture images of a route in a navigable network, whilst potentially displaying navigational information to the user. They also typically contain internal accelerometers and suitable means for obtaining a position data feed and for transmitting scan line data with respective positional data to a server. Preferably, therefore, the PND is a smartphone.

The instructions provided preferably further cause the device to upload said scan line data with respective positional data to one or more servers. Alternatively, or in addition to this, the instructions may cause the device to aggregate said scan lines into an overview image of the route. Instructions may further be provided to cause the device to upload said overview image with respective positional data from the portable navigational device to one or more servers.

Route data may comprise data extracted from the scan line data. For example, a further benefit is provided wherein the PND further comprises instructions which when executed by one or more of the processors causes the device to identify route features in the overview image. Said route features may include the number of road lanes, lane guidance indicators, road works, road signs, colours, trees, tunnels, bridges and weather.

According to a fourth aspect of the invention there is provided a method of maintaining a digital map representative of a navigable network, comprising:

accessing scan line data of a view of routes in the navigable network and related positional data for said scan line data received from one or more mobile devices;

identifying route features from the scan line data; and updating the digital map using the identified route features.

The present invention also extends to a device, optionally a server, for carrying out the method; the device being in communication with a database storing the scan line data, the scan line data being stored in association with positional data.

Thus, in accordance with a fifth aspect of the invention, there is provided a device for maintaining a digital map representative of a navigable network, comprising:

means for accessing scan line data of a view of routes in the navigable network and related positional data for said scan line data received from one or more mobile devices;

means for identifying route features from the scan line data; and means for updating the digital map using the identified route features.

The present invention in this further aspect may include any or all of the features described in relation to the fourth aspect of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors.

Enriching the map database with visual features of the route shown in the scan line data preferably comprises detecting visual features shown in the scan line data and may further comprise simulating a realistic view of the route. In one example, the scan line data and positional data is received as an overview image of the route, and stored in the database. Alternatively, an overview image of the route may be created by the device itself using scan line data stored in the database. For example, the method may comprise aggregating said scan line data into an overview image of the route, and identifying route features from the overview image. The route features may include one or more of: the number of road lanes, lane guidance indicators, road works, road signs, colours, trees, tunnels, bridges and weather.

According to a sixth aspect of the invention there is provided a method of creating a realistic view of a route in a navigable network, comprising:

receiving data indicative of a route along at least a portion of the navigable network;

accessing scan line data of a view of the route received from one or more mobile devices; and aggregating said scan line data to create a simulation of the view along the route.

The present invention also extends to a device, optionally a server, for carrying out the method; the device being in communication with a database storing the scan line data, the scan line data being stored in association with positional data.

Thus, in accordance with a seventh aspect of the invention, there is provided a device for creating a realistic view of a route in a navigable network, comprising:

means for receiving data indicative of a route along at least a portion of the navigable network;

means for accessing scan line data of a view of the route received from one or more mobile devices; and means for aggregating said scan line data to create a simulation of the view along the route.

The present invention in this further aspect may include any or all of the features described in relation to the sixth aspect of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors.

Any of the methods in accordance with the present invention may be implemented at least partially using software, e.g. computer programs. The present invention thus also extends to a computer program comprising computer readable instructions executable to perform a method according to any of the aspects or embodiments of the invention.

The invention correspondingly extends to a computer software carrier comprising such software which when used to operate a system or apparatus comprising data processing means causes in conjunction with said data processing means said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Examples of the invention are now described with reference to the accompanying drawings, in which:

FIGS. 5A, 5B and 5C are schematic illustrations of a view of a route, and FIG. 5D is an example image of a view of a route;

DETAILED DESCRIPTION

Embodiments of the present invention will now be described with particular reference to a Portable Navigation Device (PND). It should be realised, however, that the invention is applicable to any computing device comprising, or being in communication, with means for determining the position of the computing device and means for capturing image data of a route being traversed by the computing device. Further, embodiments of the present invention are described with reference to a road network. It should be realised that the invention may also be applicable to other navigable networks, such as pedestrian paths, rivers, canals, cycle paths or the like.

Figure 1:
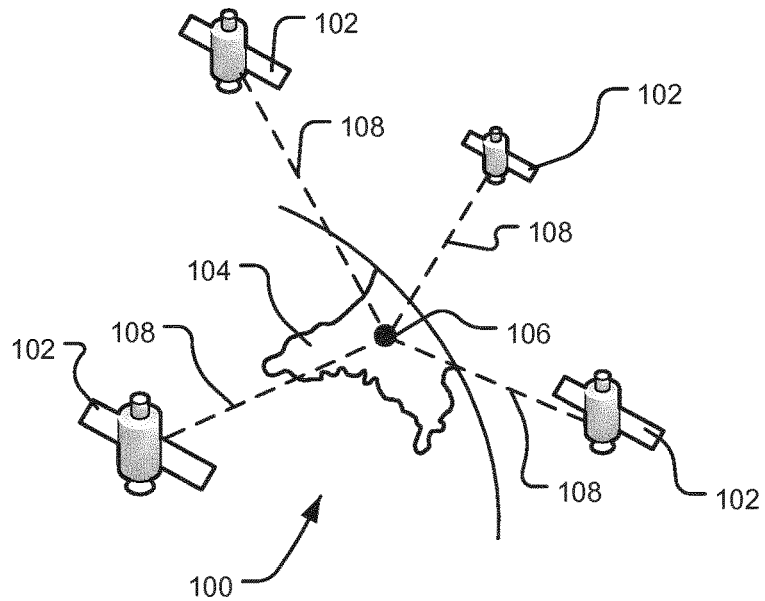
FIG. 1 is an illustration of the Global Positioning System (GPS)

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
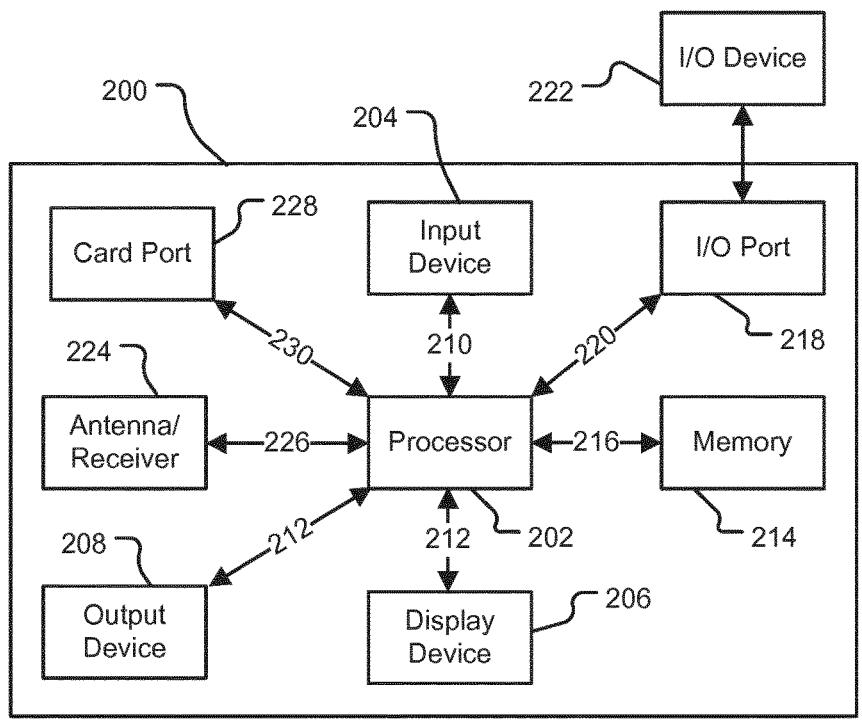
FIG. 2 is an illustration of an exemplary portable navigational device (PND)

An exemplary navigation device 200, e.g. PND, is shown in FIG. 2; it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example. A camera (not shown) and may be further provided on the exterior of the PND 200 for capturing images and an image receiver (also not shown) provided for receiving images captured by said camera.

In one arrangement, the input device 204 and the display screen 206 are integrated so as to provide an integrated input and display device, including a touchpad or touchscreen input 250 (FIG. 3) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectable to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200.

FIG. 2 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 2 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 2 are contemplated. For example, the components shown in FIG. 2 may be in communication with one another via wired and/or wireless connections and the like. Thus, the navigation device 200 described herein can be a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 3:
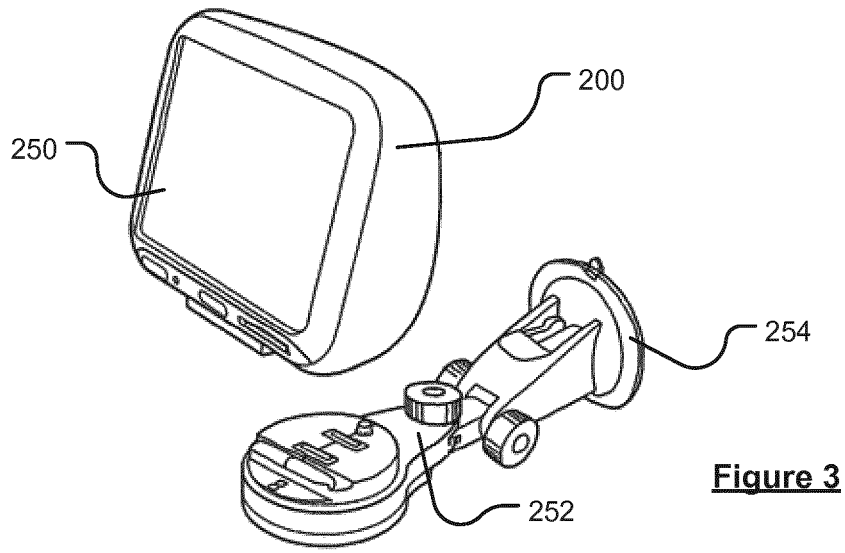
FIG. 3 is an illustration of an exemplary device and docking station.

Referring to FIG. 3, the navigation device 200 may be a unit that includes the integrated input and display device 206 and the other components of FIG. 2 (including, but not limited to, the internal GPS receiver 224, the processor 202, a power supply (not shown), memory systems 214, etc.). The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

The operation of the portable navigation device (PND) in performing various examples of the invention will now be described.

Figure 4:
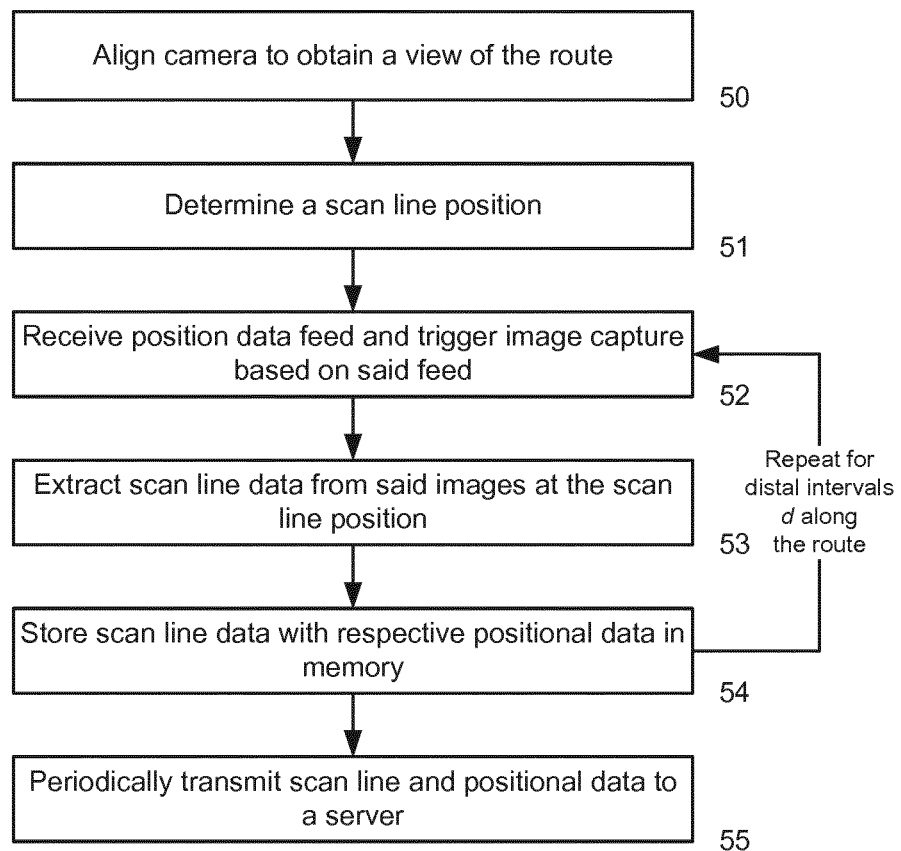
FIG. 4 is a flow diagram of a method of collecting scan line data according to an embodiment of the invention.

FIG. 4 shows a flow diagram illustrating various steps in performing first example method. Method begins at step 50 where a PND 200 (in this case a smartphone) is affixed to a windscreen of a vehicle and positioned that such a camera provided on the rear side of the PND 200, opposite to the display, is aligned to obtain a view of a route in the direction of travel, as shown, for example in FIG. 5D.

The position of a scan line 1 is determined at step 51. The method by which this is achieved will now be discussed with reference to FIGS. 4 to 7B.

Figure 10:
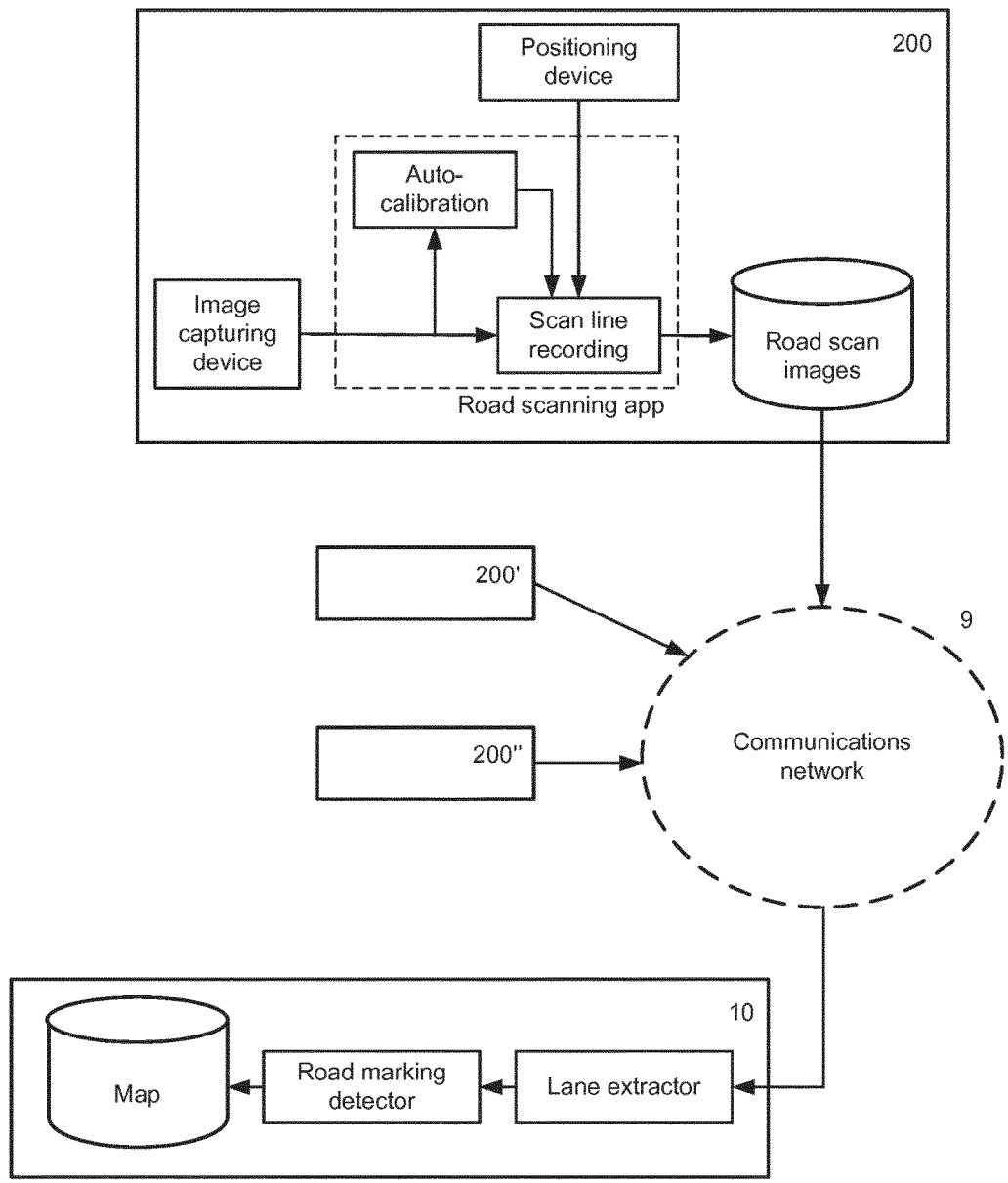
FIG. 10 is an illustration of an example of a network for transmitting and receiving route data.

FIGS. 5A, 5B and 5C show examples of the field of view of the camera, depending on the manner in which the PND is mounted in the vehicle. FIGS. 5A and 5B depict a vanishing point 7 and a hood line 8, while FIG. 5C has been positioned such that the hood line is not visible. In the method, the vanishing point 7 and the hood line 8 (if visible) are first identified in the image 2. The position of a scan line 1 is chosen with respect to the vanishing point 7 and hood line 8, so that it extends across a broad view of the route at a high level of detail. This ensures that the scan line data includes visual information of the route that is useful to map builders in generating a realistic view of a route. The functionality of the dynamic determination of the vanishing point and the hood line for use in determining the position of the scan line is illustrated by the auto-calibration module of the road scanning app (operating on PND 200) is shown in FIG. 10.

Figure 6:
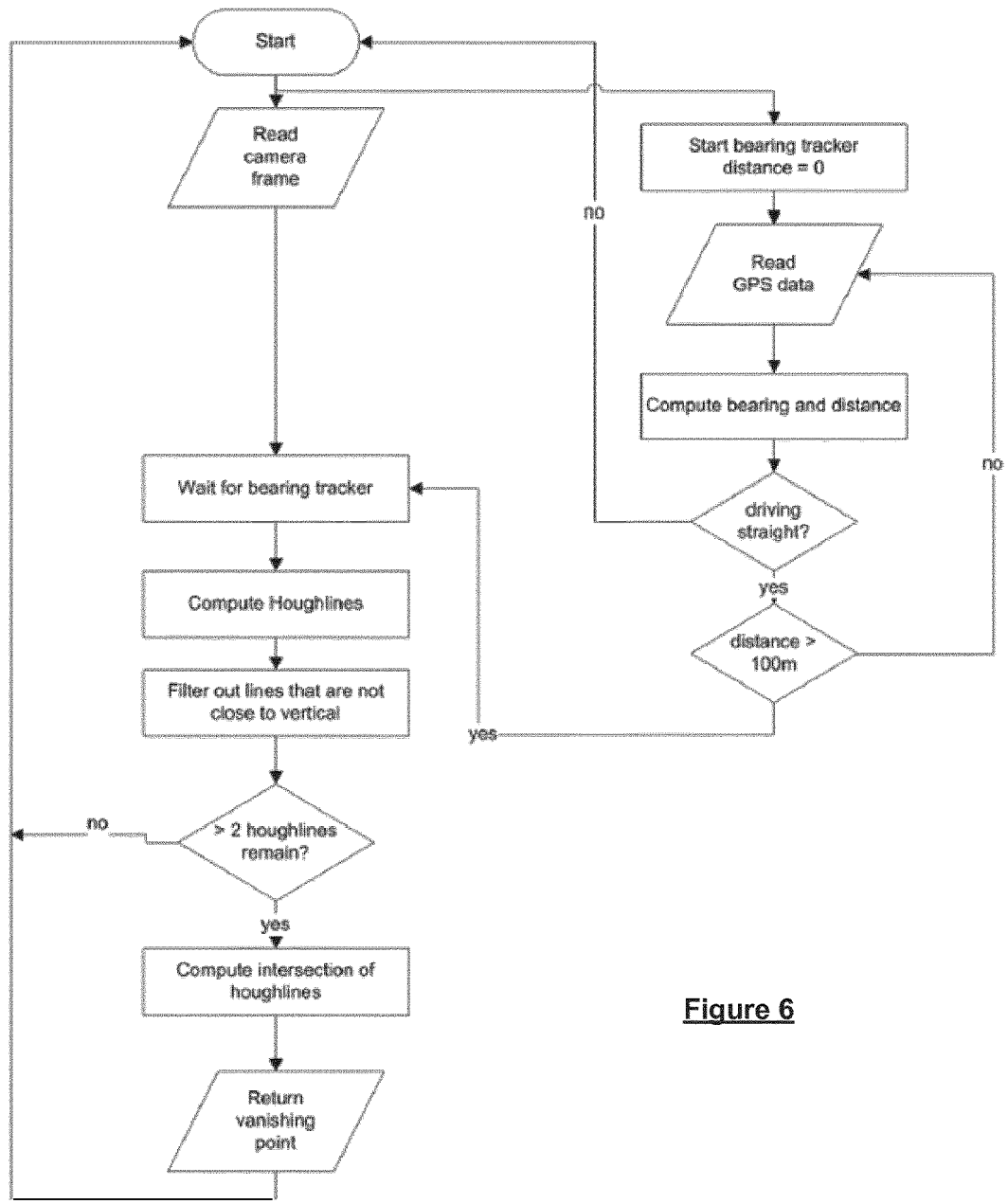
FIG. 6 is a flow diagram of a method for identifying the vanishing point.

The method by which the vanishing point 7 is monitored will now be discussed with reference to the flow chart of FIG. 6. An image of the route is first obtained using the camera and a bearing tracker is started that monitors if the car is driving in a straight line for a predetermined distance. A bearing tracker is set to zero and a position data feed, based on GPS data received by a GPS receiver within the PND 200, is monitored. A first bearing of the device is monitored at a first position (distance=0 m). This bearing relates to the angle of the movement of the device on the surface of the earth and may be measured by monitoring the PND 200 movement over a small distance, e.g. 10 metres or less, or potentially using data received from a digital compass provided within the PND 200 itself. Once the position data feed indicates that a distance of 100 metres has been travelled, a second bearing is recorded at a second position (distance=100 m). A processor provided within the PND 200 then compares the first bearing and the second bearing to determine whether the vehicle or PND 200 has been travelling in a substantially straight line between the first and the second positions. If the results of this analysis suggest that the PND 200 has not been travelling in a straight line, the image is discarded and the above steps are repeated.

Once it has been determined that the vehicle (or PND 200) is travelling in a substantially straight line, Hough lines 4 are identified in the image received from the image receiver. These Hough lines 4 are straight lines in the direction of travel that typically mark out the edge of lanes in the route ahead and thus may be solid or dashed lines. Example Hough lines 4 are identified in FIG. 5D. As will quickly be realised, these lane markings are substantially vertical in a central portion of the view and increasingly horizontal towards the left and right sides of the view. The Hough lines 4 shown in FIG. 5D that mark the edge of the lane in which the vehicle (and with it the PND 200) is travelling along are taken to be close to vertical. Lines that do not meet this description are filtered out by a processing step and the intersection of the remaining two or more Hough lines 4 is calculated. This intersection is typically not actually visible itself in the view of the route 2 and must be calculated by extrapolating the lines so as to compute a theoretical intersection. This is called the vanishing point 7. This vanishing point 7 provides an estimate as to the height of (or y-position) the horizon 5.

Knowing the position of the vanishing point can help in determining the position of the scan line, and in interpreting said scan lines. In the event that data is sought concerning road features only, everything above the y-position of the vanishing point is not relevant. The x-position is later relevant for reconstructing the road features.

Once the position of the vanishing point 7 has been determined, a hood line 8 is monitored. The hood line 8 corresponds to the outline of the vehicle hood in the image and is the boundary between the hood and the route ahead. It is assumed to be predominantly horizontal, although there may be a slight curvature, and typically static, although it may appear to vibrate slightly due to vibrations of the camera. Hood detection can be performed using object recognition techniques of the type that are common in the art. An example of a suitable method illustrating an algorithm for monitoring the hood line is set out in FIG. 7A. The first step of the method is to determine features in the image to track (referred to as "good points"). At step 72 these points are followed in subsequent images forming an optical flow that can be monitored using an optical flow algorithm to form track lines. Points that are in the region of interest will move down in subsequent images (assuming that the vehicle is moving towards these features) to the hood and will disappear there, whereas points on the hood will remain static. Any "bad" lines that, for example are not straight, are filtered out. In steps 74 and 75 this optical flow monitoring is looped until it is determined that there are no more points left to track, or until a maximum track time has been exceeded. At step 76 the lowest position or points of the track lines are stored and the hood line is determined by analysing the distribution of low points. In the event that no hood line 8 is present in the image, a notional hood line 8 may be set at the bottom of the image outside the field of view (y=0).

Figure 7A:
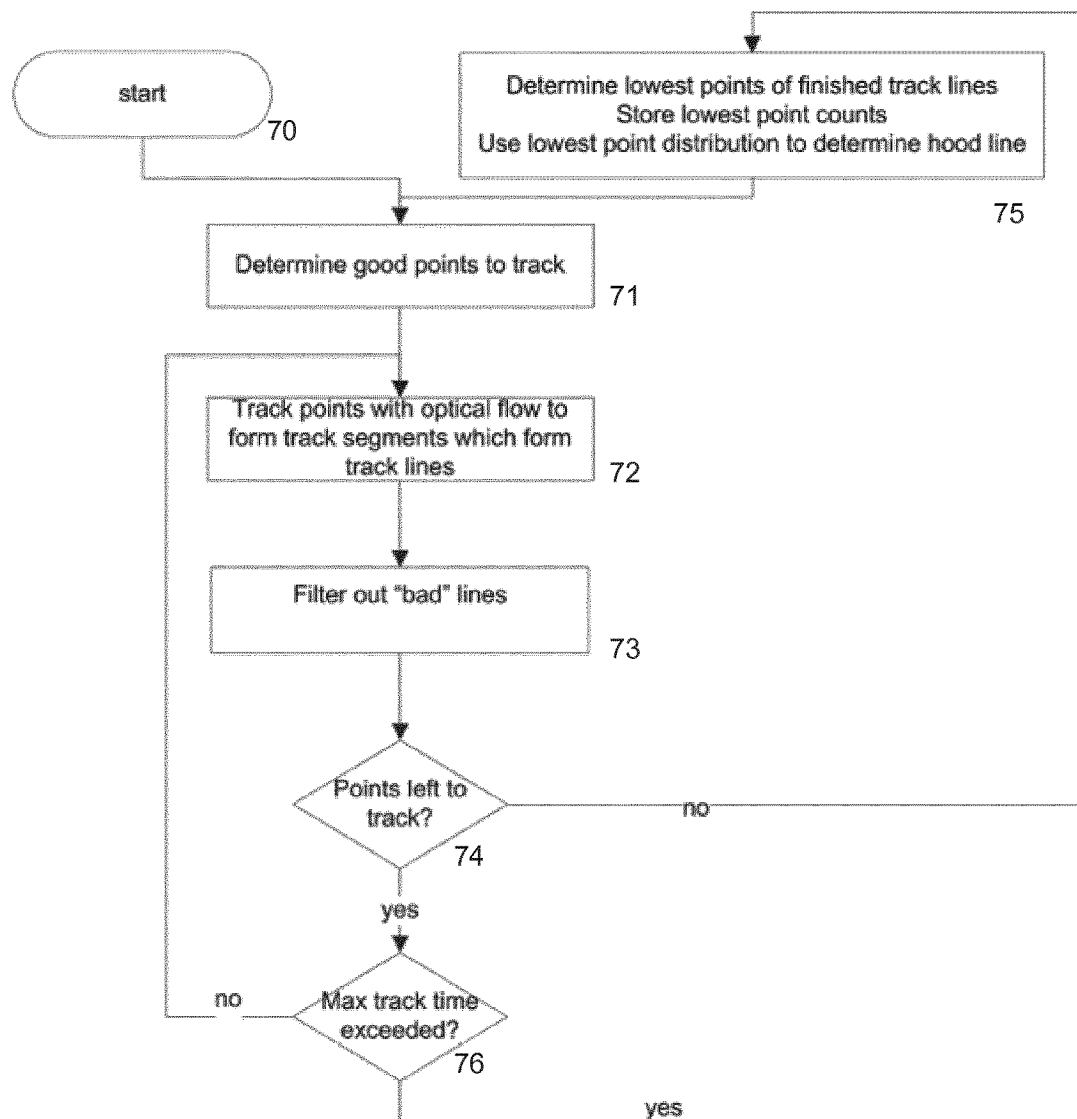
FIG. 7A is a flow diagram of a method for identifying the hood line.
Figure 7B:
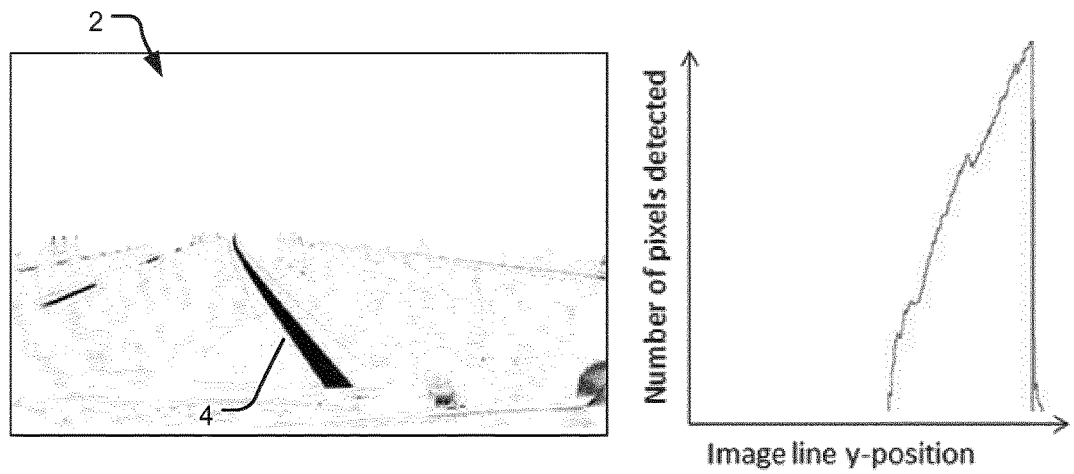
FIG. 7B shows the results from an alternative method for identifying the hood line.

An alternative, or potentially complementary, method for monitoring the hood line 8 is illustrated in FIG. 7B. Features, such as road line markings, in the field of view of the camera are widest in the foreground (at the bottom of the image) and most narrow farthest away from the PND (i.e. at the top of the image 2, beneath the horizon 7). This is clearly shown by the image on the left of FIG. 7B; which shows a digitally enhanced view of a route with the lane markings emphasised. A histogram may be created (shown in the image to the right of FIG. 7B) to plot the number of pixels detected as lane markings against the image line or 'height' in the y-direction. As shown, the histogram shows a steep incline where the road markings widen towards the bottom of the image and then a sharp drop-off as the features are obscured from the field of view. The position of this drop can be used as the hood line, or the lowest line to be used for scan lines.

Figure 8A:
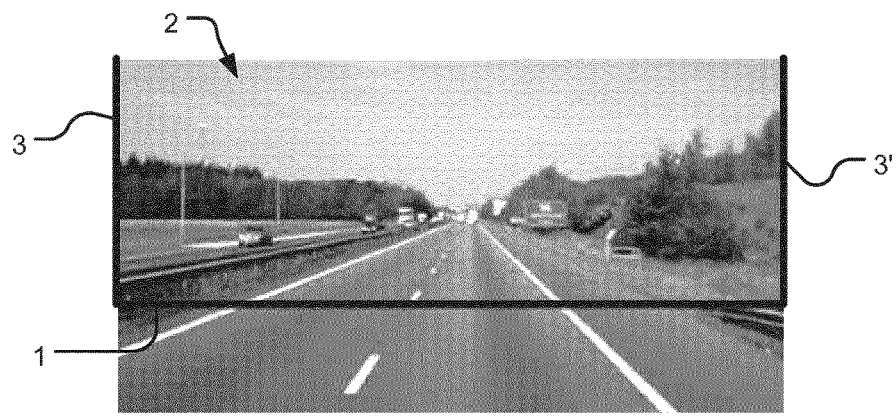
FIGS. 8A and 8B are illustrations of example scan lines.
Figure 8B:
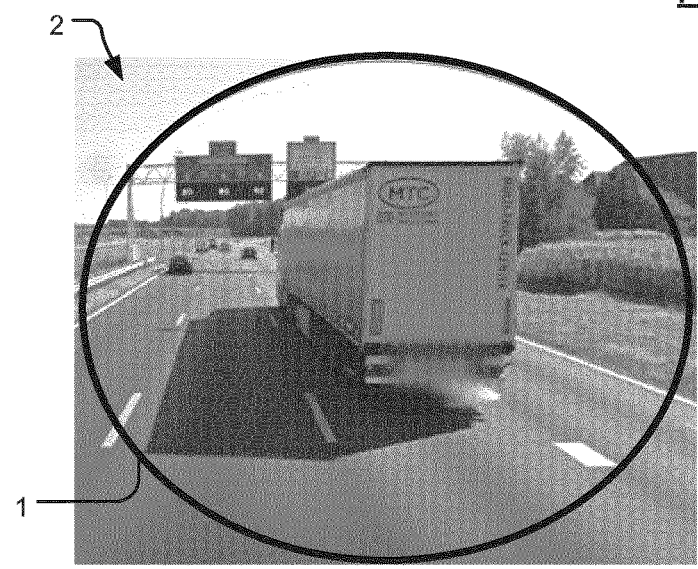

Once a vanishing point 7 and a hood line 8 have been calculated, a scan line 1 is chosen at a predetermined position with respect to the hood line 8 and vanishing point 7. FIGS. 8A and 8B show example images 2 of views obtained from a PND 200 with a scan line 1 illustrated at a predetermined position on each image 2. In FIG. 8A a horizontal flat scan line 1 is positioned approximately halfway between a monitored vanishing point and the bottom of the image 2. In FIG. 8B an elliptical scan line 1 is used; centred at a position offset from the vanishing point by a predetermined amount.

It is important to select a suitable height for the scan line 1. The most bottom line results are the widest and most position accurate claim markings but the field of view is small. Recording a line higher up the image gives more overview (and more lanes), but loses detail. The optimal solution is somewhere in between. In embodiments, the scanline may comprise the vertical lines 3, 3' at the side of the image 2 in addition to the horizontal line 1.

An alternative solution, as shown by FIG. 8B, is not just to scan straight line but to scan an area of the image covered by a bowl shaped arc or ellipse. This provides a high level of detail in the centre and more overview on the outside of the lanes in a resulting picture. An advantageous property of using a circles or ellipses is that they rarely captures pixels of cars in front in the same lane, because the current lane is at the bottom of the image, and still has a wide viewing angle covered. Furthermore its output is more robust for cameras that are slightly rotated over the viewing axis (i.e. with a view not parallel to the horizon 5). Yet another alternative is to use a four line box of pixels, i.e. an area of the image covered by a square or rectangle, to scan the data. This has the advantage that no interpolation of pixel values is required which is the case when scanning over an arc or ellipse.

The hood line 8 and the vanishing point 7 is monitored continuously on a loop as the PND 200 travels along the route and the scan line 1 position is dynamically determined; i.e. adjusted in the event that the positioning of the vanishing point 7 or hood line 8 changes. This could be case, for example, if the PND 200 is moved such that the tilt camera changes along the view of the route 2.

Returning again to FIG. 4, at step 52 a position data feed is received by a position data feed receiver (which may be a logical component implemented by software and/or hardware) and a trigger signal is issued by the processor in accordance with this feed so as to cause the camera to capture images 2 of the route. In this example the processor is configured to issue a trigger signal for every metre travelled by the PND 200. At step 53 scan line imagery data is extracted from only a fraction of each image that extends along the scan line 1 at the predetermined scan line position. The position of the route imaged by the scan line 1 is then calculated based on the position data feed. For example, the calculation may use trigonometry with reference to the vanishing point 7 and the hood line 8, so as to compensate for the fact that the scan line lies in front of the PND 200, rather than at the position of the PND 200.

At step 54 the scan line data is compressed using JPEG compression (or other compression technique), optionally converted to a greyscale image, and stored on memory together with respective positional data for the scan line 1 indicating the position of the shown in the scan line 1. Steps 52 to 54 are repeated for distal intervals of d, in this case every metre, along the route. The scan line data and respective positional data is periodically transmitted to a server at step 55 every hour. Alternatively this data may be transmitted in response to a request signal issued by a server and received by the PND 200. Alternatively the data may be transmitted to server when the PND 200 is connected, wired or wirelessly, to means for communicating with the server.

Figure 9:
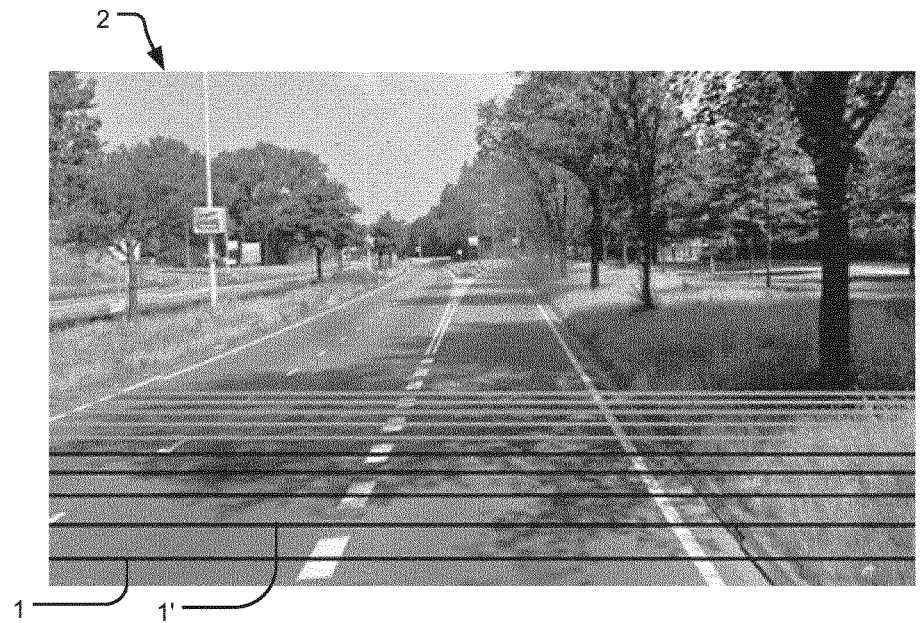
FIG. 9 is an example of a view of a route with multiple scan lines being obtained.

In a second example method, shown in FIG. 9, multiple scan lines 1,1' are obtained from a single image 2 of a route. Given the hardware specifications of the camera, it is possible to perform geometric computations image of the road ahead. For instance, the real world distance between two horizontal lines in the image can be computed if the vanishing point 7 has been determined or calibrated. If a certain real world inter-distance of scan lines is desired, as is typically the case, and the frame rate of the camera is high then using one scan line per frame can be sufficient. However, if the camera cannot deliver one frame per requested sample distance, then the intermediate frame information can be obtained by using multiple scan lines in the scan frame, where each scan line represents a different distance from the vehicle or PND 200. For equidistance scans, the number and position of the scan lines needed in each frame depends on the frame rate of the speed of the car (which can be obtained from the position data feed). For a given scan line distance d, speed and a frame rate, the number of scan lines n needed per frame is:

$$n = \frac{\text{speed}}{d \times \text{frame rate}}$$

For example, with a frame rate of 20 frames per second, an interline distance of 15 centimetres and a speed of 70 kilometres per hour, the number of scan lines to be taken per frame equals approximately 6.5. The y-position at which a line should be scanned in the captured image relative the wide position of the vanishing point is inversely proportional to the real world distance from the PND 200 to the scanned position z (towards the vanishing point), assuming a correctly mounted camera. The same principle can be applied to box or ellipse scanning.

In FIG. 9 a first scan line is labelled 1 and a second scan line offset by 15 centimetres in the direction of travel is labelled 1'. The horizontal lines in black mark the scan lines to be extracted in the current frame. The number of lines to be scanned is determined by the time travelled between this frame and the next frame. The grey lines are shown simply to illustrate the positions that will be scanned in the next frame. It may be necessary to interpolate GPS positional data since scan lines may be obtained at smaller intervals that can be detected from the position data feed.

In a further example accelerometers within the PND 200 are used to detect that the camera is not mounted parallel the horizon 5 and the position or angle of the scan line 1 is adjusted accordingly, for example by using a diagonal scan line 1. These accelerometers may also be used to correct for artefacts in an image or scan line 1 that are the result of vibrations of the car and the camera.

An example of a network for transmitting and receiving route data will now be described with reference to FIG. 10. Scan line data and related positional data is transmitted, for example periodically, from a plurality of PNDs 200, 200' and 200", via a (wireless) communication network 9, such as a 4G LTE or 3G cellular network, to a server 10. The server 10 may comprise one or more processors and a receiver configured to receive via the communication network 9 scan line data of a view of a route in a navigable network and related positional data for said scan line data. The server 10 further comprises memory comprising instructions which when executed by one or more of the processors causes the server to process the scan line data with reference to a determined position of the scan line in a map database based on positional data received from the scan lines so as to enrich the database with visual features of the route shown in the scan line data. This "enrichment" of the map database may comprise augmenting the database to enable a "realistic" view of the route of the digital map to be generated and could, for example, include generating an overview image, realistic road rendering, reading road signs, identifying lane markers, lane number determination, road-side and land-use detection (trees, buildings, colour palettes), and, when using mobile networks, weather detection. This functionality is illustrated by the road marking detector and lane extractor modules shown in FIG. 10. Furthermore, images of a route may be stitched together in order to form a preview movie of a route. The server may effectively fuse the gathered image data from several devices with the map database to allow a realistic 3D view of the route to be simulated, based on the image data. The updated map is then distributed to the devices again through a feedback loop. Alternatively, the network may potentially be used to create a "live" map with real-time updates.

Figure 11:
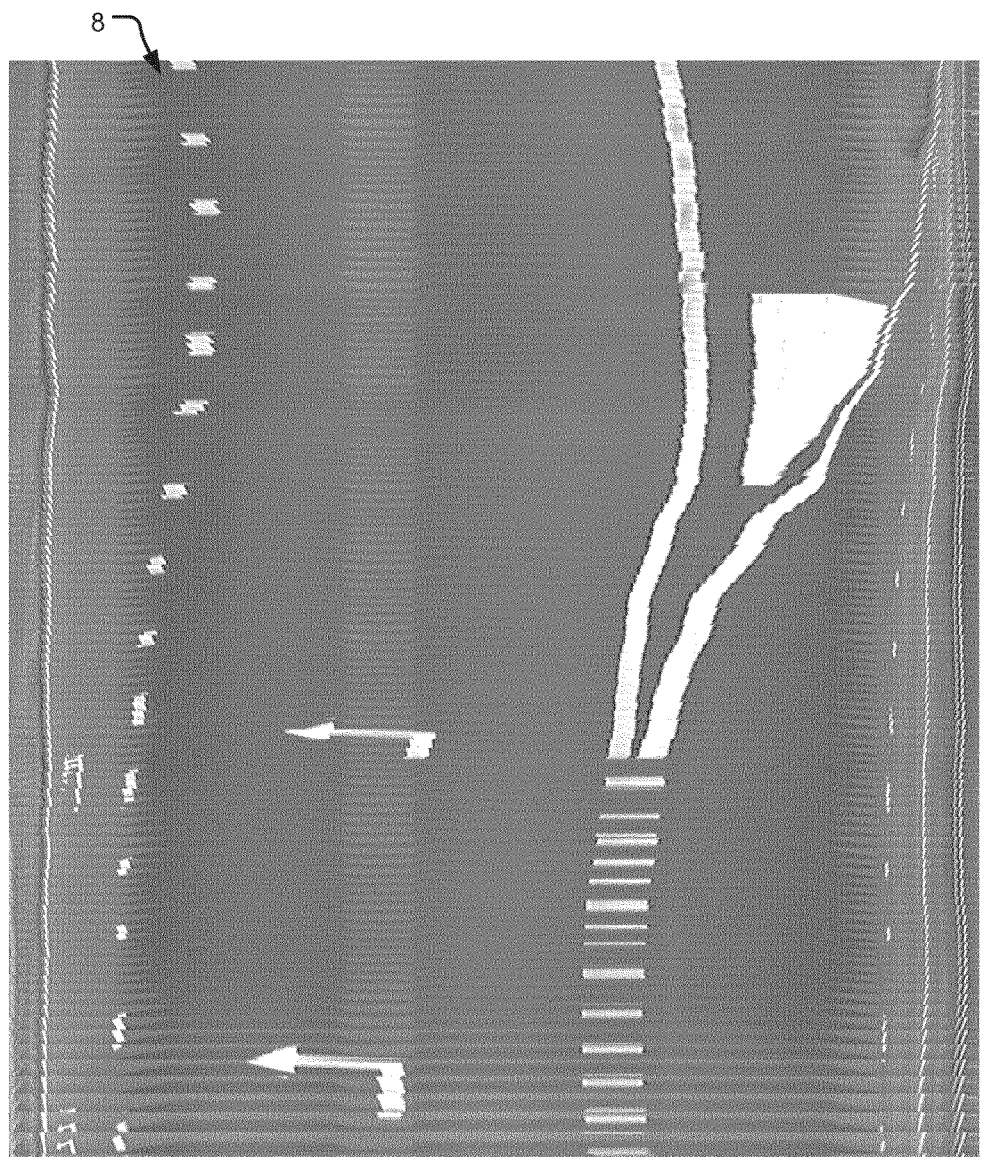
FIG. 11 is an example of an overview image.

An example of an overview image 8 (also known as a bird's eye map) of a route shown in FIG. 11 in which individual horizontal scan lines 1 have been aggregated together, parallel to one another, at their respective positions along a route. Although an overview image may be created by the PND 200 itself and transmitted to the server 10, in this example the overview image 8 is created by the server 10 using scan line data with respective positional data obtained from a plurality of PND 200 travelling slightly different routes in a digital map (as evidenced by the branching out of the different lanes). A number of visual features in the overview image 8 are visible; such as lane markings and road signs imprinted onto the road. These visual features may be identified by the server 10 and inputted in to the mapped database so as to improve the quality of the route data or enrich the map database with this additional information. A 3D realistic view of the route may then be generated based on the enriched map database by simulating the view of the route to include representations of this additional information, for example, based on the road markings and signs captured in the scan line data.

A particular benefit is provided wherein multiple portable navigational devices 200, 200', 200" travelling along different routes in a navigable network are provided and connected to a server 10 such that route information used in the production of digital maps can be crowd sourced. A high number of PNDs can thus provide up-to-date route data of visual features in a navigable network which is a higher quality of up to date information. Since the software or computer readable medium required to execute the above method be readily and inexpensively downloaded, the costs in obtaining this route data can be drastically reduced, if compared to satellite images or mobile mapping vehicles for example. This allows for a much wider number of potential sources for obtaining and transmitting route data to be in circulation at any one time.

Software instructions provided on the server memory, can be used to control the scan line data that is sent across the network 9. For example, the server 10 may issue a request signal to the communication network 9 requesting scan line data with respective positional data from a certain set or subset of PNDs at specified locations on a digital map. This is desirable to limit the quantity of data that is sent over the network 9. In this example an automatic process within the server 10 may require new scan line data to be obtained daily, within a specified time window (during daylight hours) for each position on a map. If this has not yet been received a signal is sent by the server 10 activating any PND 200 within range of this location to obtain scan line data and transmit it across the network 9. This signal may be terminated once the data is received. This ensures that the digital maps are kept up-to-date but reduces unnecessary computing effort being expended.

In a further example, scan line data received from a plurality of PNDs 200, 200' and 200" within a network at substantially similar locations is utilised. Scan line data from individual trips is analysed and marker information is extracted from them. The set of extracted marker information is then used in a fusion process to be combined statistically. When subsequent a PND passes over the same route, a marker analysis is performed on the collected scan lines of each trip, and the resulting marker information is fused to obtain statistically relevant results.

Figure 12:
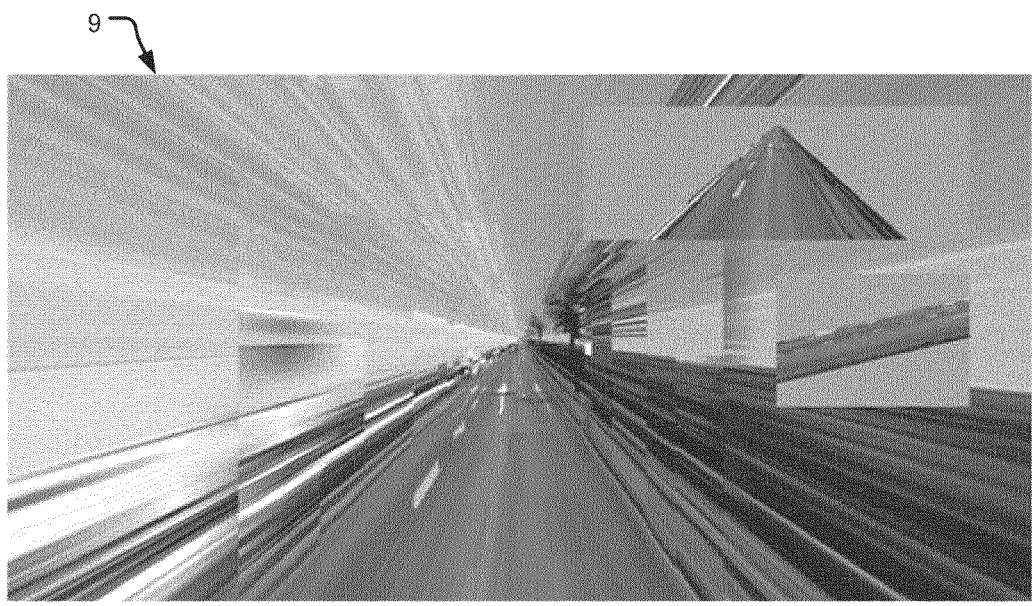
FIG. 12 is an example of a reconstructed image of scan lines obtained using box scanning.

FIG. 12 shows an example of a reconstructed '3D image', or route preview, of scan lines obtained using a rectangular scan line (also known as box scanning). The top inlay image shows a perspective view of the air excluded and the sides folded aside, a second inlay image shows a top view. Reconstructed images like this can be stitched together and used as a strong compression method for route driving movies. The cost of storing scan line data and coordinates is significantly lower than the cost of storing an entire MPEG movie. This video is typically processed and obtained remotely by a scanner 10, however could alternatively be produced by the PND 200 itself.

Any of the methods in accordance with the present invention may be implemented at least partially using software e.g. computer programs. The present invention thus also extends to a computer program comprising computer readable instructions executable to perform, or to cause a navigation device to perform, a method according to any of the aspects or embodiments of the invention. Thus, the invention encompasses a computer program product that, when executed by one or more processors, cause the one or more processors to generate suitable images (or other graphical information) for display on a display screen. The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

The invention claimed is:

1. A method for generating route data, comprising:
receiving a position data feed pertaining to a position of an image capturing device travelling along a route in a navigable network;
receiving images of the route captured using the image capturing device as the image capturing device progresses along the route so as to obtain a view of the route;
extracting scan line data from said images, said scan line data for an image comprising a linear portion of the image of a predetermined width that extends along a scan line of a predetermined shape, the linear portion of the image including a fraction of the image, the fraction being of a small number of pixels in width relative to a number of pixels in an overall width of the image;
storing said scan line data in memory together with respective positional data for the scan line, wherein said positional data is based on the position data feed; and
providing said scan line data extracted from said images and said respective positional data to one or more remote devices, said scan line data configured to be processed by said one or more remote devices to generate a realistic view of said route, said processing comprising using said respective positional data for said scan line data and other respective positional data associated with other scan line data received from one or more other image capturing devices that traveled along said route to stitch said scan line data together with said other scan line data to generate said realistic view of said route, and augmenting, by said one or more remote devices, a map database by storing in said map database said realistic view of said route.

2. The method according to claim 1, comprising monitoring the position of a vanishing point in the view of the route, and arranging the scan line at a predetermined position with respect to the vanishing point.

3. The method according to claim 1, wherein the image capturing device is positioned within a vehicle, and wherein the method comprises:
monitoring a hood line corresponding to the outline of a vehicle hood in the view of the route;
monitoring the position of a vanishing point in the view of the route; and
arranging the scan line at a predetermined position with respect to the hood line and the vanishing point, such that the scan line is between the vanishing point and the hood line and does not substantially intersect the hood line.

4. The method according to claim 3, wherein monitoring a hood line comprises:
tracking one or more features shown in images of the route that move downwards between successive images of the route as the camera moves towards said features;
monitoring the lowest positions of said moving features shown in the field of view of the camera; and
determining a hood line based on said monitored lowest positions.

5. The method according to claim 2, wherein said monitoring the position of a vanishing point comprises:
monitoring first and second bearings in the direction of travel at first and second positions respectively based on the position data feed;
calculating if the device was travelling in a substantially straight line between the first and second positions in accordance with said monitored first and second bearings;
monitoring two or more straight road lines in the view of the route in the direction of travel;
calculating the intersection position for said road lines; and,
if the device was calculated to be travelling in a substantially straight line between the first and second positions, outputting said intersection position as the vanishing point in the view of the route.

6. The method according to claim 2, wherein said predetermined position of the scan line is dynamically determined.

7. The method according to claim 1, wherein said scan line, or at least a portion thereof, is one of: a rectangle; a substantially horizontal straight line that extends substantially across the field of view; an arc; and an ellipse.

8. The method according to claim 1, wherein the images of the route are captured at a constant frame rate from a video feed obtained from the image capturing device.

9. The method according to claim 1, wherein said image capture is triggered in accordance with predetermined image capture distances along the route based on the position data feed.

10. The method according to claim 9, wherein said predetermined image capture distances are equidistant.

11. The method according to claim 1, comprising monitoring the velocity of the image capturing device in accordance with the position data feed and, if at said velocity the frame rate required to capture images of the route at said predetermined image capture distances exceeds a maximum frame rate of the camera, to obtain scan line data from one or more additional scan lines from said images, wherein the position of each additional scan line is determined so as to cover a view of the route at a predetermined image capture distance.

12. The method according to claim 1, wherein the respective positional data for the scan line data which is stored in memory accounts for the distal separation between the device itself, which is obtained from the position data feed, and the position of the route shown by the scan line.

13. The method according to claim 1, wherein said position data feed is obtained from a navigation satellite system receiver.

14. The method according to claim 1, wherein providing said scan line data and said respective positional data to one or more remote devices comprises uploading said scan line data with respective positional data to one or more servers.

15. The method according to claim 1, wherein:
said processing comprises extracting, by said one or more remote devices, from said scan line data alone or said realistic view of said route, features of said route; and
said augmenting comprises storing, by said one or more remote devices, information about the features of said route in said map database.

16. A device for generating route data, comprising at least one processor and a memory coupled to the at least one processor, wherein the at least one processor is arranged to:
receive a position data feed pertaining to a position of an image capturing device travelling along a route in a navigable network;
receive images of the route captured using the image capturing device as the image capturing device progresses along the route so as to obtain a view of the route;
extract scan line data from said images, said scan line data comprising a linear portion of the image of a predetermined width that extends along a scan line of a predetermined shape, the linear portion of the image including a fraction of the image, the fraction being of a small number of pixels in width relative to a number of pixels in an overall width of the image;
store said scan line data in the memory together with respective positional data for the scan line, wherein said positional data is based on the position data feed; and
provide said scan line data extracted from said images and said respective positional data to one or more remote devices, said scan line data configured to be processed by said one or more remote devices to generate a realistic view of said route, said processing comprising using said respective positional data for said scan line data and other respective positional data associated with other scan line data received from one or more other image capturing devices that traveled along said route to stitch said scan line data together with said other scan line data to generate said realistic view of said route, and augmenting, by said one or more remote devices, a map database by storing in said map database said realistic view of said route.

17. The device according to claim 16, further comprising at least one accelerometer configured to monitor a tilt of the image capturing device, and wherein the device is configured to adjust the position of the scan line in accordance with said monitored tilt.

18. The device according to claim 16, further comprising at least one accelerometer configured to detect vibrations of the camera, and wherein the device is configured to correct for artefacts in the images that result from said vibrations.

19. A non-transitory computer readable medium comprising instructions which, when executed by one or more processors of a device, cause the device to perform a method for generating route data, the method comprising:
receiving a position data feed pertaining to a position of an image capturing device travelling along a route in a navigable network;
receiving images of the route captured using the image capturing device as the image capturing device progresses along the route so as to obtain a view of the route;
extracting scan line data from said images, said scan line data for an image comprising a linear portion of the image of a predetermined width that extends along a scan line of a predetermined shape, the linear portion of the image including a fraction of the image, the fraction being of a small number of pixels in width relative to a number of pixels in an overall width of the image;
storing said scan line data in memory together with respective positional data for the scan line, wherein said positional data is based on the position data feed; and
providing said scan line data extracted from said images and said respective positional data to one or more remote devices, said scan line data configured to be processed by said one or more remote devices to generate a realistic view of said route, said processing comprising using said respective positional data for said scan line data and other respective positional data associated with other scan line data received from one or more other image capturing devices that traveled along said route to stitch said scan line data together with said other scan line data to generate said realistic view of said route, and augmenting, by said one or more remote devices, a map database by storing in said map database said realistic view of said route.

20. The method according to claim 1, comprising generating an overview image of the route from at least two of said scan lines, the generating comprising placing each of the at least two of said scan lines at a corresponding position in the overview image based at least in part on the respective positional data for that scan line.

21. The device according to claim 16, wherein the at least one processor is arranged to generate an overview image of the route from at least two of said scan lines, the generating comprising placing each of the at least two of said scan lines at a corresponding position in the overview image based at least in part on the respective positional data for that scan line.

22. The non-transitory computer readable medium according to claim 19, wherein the method comprises generating an overview image of the route from at least two of said scan lines, the generating comprising placing each of the at least two of said scan lines at a corresponding position in the overview image based at least in part on the respective positional data for that scan line.

23. The method according to claim 15, wherein said features include one or more of: the number of road lanes, lane guidance indicators, road works, road signs, colors, trees, tunnels, bridges and weather.

24. The device according to claim 16, wherein:
said processing comprises extracting, by said one or more remote devices, from said scan line data alone or said realistic view of said route, features of said route; and
said augmenting comprises storing, by said one or more remote devices, information about the features of said route in said map database.

25. The non-transitory computer readable medium according to claim 19, wherein:
- said processing comprises extracting, by said one or more remote devices, from said scan line data alone or said realistic view of said route, features of said route; and
- said augmenting comprises storing, by said one or more remote devices, information about the features of said route in said map database.

* * * * *